(12) United States Patent
Patel et al.

(10) Patent No.: US 9,752,004 B2
(45) Date of Patent: Sep. 5, 2017

(54) CELL SIZE ENLARGERS FOR POLYSTYRENE FOAMS

(75) Inventors: Bharat Patel, Dublin, OH (US); Yadollah Delaviz, Lewis Center, OH (US); Raymond M. Breindel, Hartiville, OH (US); Mitchell Z. Weekley, Tallmadge, OH (US); Roland R. Loh, Stow, OH (US); Manoj K. Choudhary, Reynoldsburg, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 11/472,772

(22) Filed: Jun. 22, 2006

(65) Prior Publication Data

US 2007/0299152 A1     Dec. 27, 2007

(51) Int. Cl.
*C08J 9/00*     (2006.01)

(52) U.S. Cl.
CPC .......... *C08J 9/0061* (2013.01); *C08J 9/0014* (2013.01); *C08J 2325/06* (2013.01); *C08J 2423/00* (2013.01); *C08J 2471/00* (2013.01)

(58) Field of Classification Search
CPC .......................... C08J 2325/06; C08J 9/0014
USPC ............................. 521/79, 97, 139; 772/79
See application file for complete search history.

(56) References Cited

U.S. PATENT DOCUMENTS

| | | | |
|---|---|---|---|
| 4,229,396 A | 10/1980 | Suh et al. | |
| 4,613,629 A | 9/1986 | Duchane et al. | |
| 5,358,675 A | 10/1994 | Campbell et al. | |
| 5,489,407 A | 2/1996 | Suh et al. | |
| 5,532,284 A * | 7/1996 | Bartlett et al. | 521/134 |
| 5,654,347 A * | 8/1997 | Khemani et al. | 521/138 |
| 5,817,705 A | 10/1998 | Wilkes et al. | |
| 5,863,960 A * | 1/1999 | Shmidt et al. | 521/146 |
| 5,912,279 A | 6/1999 | Hammel et al. | |
| 5,962,545 A * | 10/1999 | Chaudhary et al. | 521/146 |
| 6,031,012 A | 2/2000 | Nakanishi et al. | |
| 6,063,823 A | 5/2000 | Nakatani et al. | |
| 6,069,183 A * | 5/2000 | Wilkes et al. | 521/139 |
| 6,071,580 A * | 6/2000 | Bland et al. | 428/36.5 |
| 6,310,112 B1 * | 10/2001 | Vo et al. | 521/134 |
| 6,355,341 B1 | 3/2002 | Chaudhary et al. | |
| 6,583,188 B2 | 6/2003 | Chaudhary et al. | |
| 6,583,193 B2 | 6/2003 | Park et al. | |
| 6,608,141 B2 | 8/2003 | Krupinski et al. | |
| 6,632,382 B1 * | 10/2003 | Miller et al. | 264/45.9 |
| 6,787,580 B2 | 9/2004 | Chonde et al. | |
| 6,790,870 B1 | 9/2004 | DiSimone et al. | |
| 6,958,365 B2 | 10/2005 | Dontula et al. | |
| 8,119,701 B2 * | 2/2012 | Delaviz et al. | 521/97 |
| 2002/0155270 A1 | 10/2002 | Chaudhary | |
| 2004/0039072 A1 | 2/2004 | Park | |
| 2005/0112356 A1 | 5/2005 | Rynd et al. | |
| 2006/0030632 A1 | 2/2006 | Krueger et al. | |

FOREIGN PATENT DOCUMENTS

| | | |
|---|---|---|
| CN | 1055187 | 10/1991 |
| CN | 1426434 | 6/2003 |
| MX | 2008/002469 | 4/2008 |

OTHER PUBLICATIONS

International Search Report and Written Opinion from PCT/US07/014491 dated Nov. 16, 2007.
Office action from Chinese Application No. 200780023166.3 dated Jan. 12, 2011.
Office action from Chinese Application No. 200780023166.3 dated Jun. 27, 2011.
Office action from Chinese Application No. 200780023166.3 dated Oct. 10, 2011.
Office action from Chinese Application No. 200780023166.3 dated Feb. 16, 2012.
Office action from Chinese Application No. 200780023166.3 dated Jun. 27, 2012.
Office action from Mexican Application No. 08/16305 dated Nov. 7, 2011 along with English translation of relevant portions of action.
Office action from Mexican Application No. 08/16305 dated May 7, 2012 along with English translation of relevant portions of action.
Office action from Chinese Application No. 200780023166.2 dated Sep. 25, 2013.
Office action from Indian Application No. 5072/KOLNP/2008 dated Oct. 29, 2013 dated Oct. 29, 2013, 2 pgs.
Office action from Chinese Application No. 200780023166.3 dated May 29, 2014, 14 pgs.

(Continued)

*Primary Examiner* — Melissa Rioja
(74) *Attorney, Agent, or Firm* — Calfee, Halter & Griswold LLP

(57) ABSTRACT

Polymer extruded foams that contain cell size enlarging agents are provided. The inventive composition includes a foamable polymer material, at least one blowing agent, and at least one cell size enlarging agent. The blowing agent utilized in the inventive composition is preferably selected such that the composition has a zero ozone depletion and low global warming potential. Examples include any inorganic blowing agents and/or non-hydrogenated chlorofluorocarbons (non-HCFCs). The foamable polymer material is preferably polystyrene. The cell size enlarging agent may be chosen from ethylene vinyl acetate (EVA) and/or ethylene methyl acrylate (EMA). The cell size enlarging agent permits the formation of a foam with large cell sizes that are desirable to achieve a high insulation value and to optimize the physical properties of the foamed product. In addition, the cell size enlarging agent provides an increased cell size to the foamed product without detracting from the physical and thermal properties.

5 Claims, 7 Drawing Sheets

(56) References Cited

OTHER PUBLICATIONS

Office action from Chinese Application No. 200780023166.3 dated Nov. 3, 2014.
Office action from Indian Application No. 5072/KOLNP/2008 dated Jan. 15, 2015.
Office action from Canadian Application No. 2,666,108 dated Aug. 1, 2013.
Office action from Chinese Application No. 201510054366.1 dated Dec. 7, 2016.

* cited by examiner

CELL SIZE ENLARGERS FOR POLYSTYRENE FOAMS

REFERENCE TO GOVERNMENT RIGHTS

This invention was made with Government support under Advanced Technology Program (ATP) Grant No. 70NANB2H3023 awarded by the National Institute of Standards and Technology (NIST). The Government may have certain rights to this invention.

TECHNICAL FIELD AND INDUSTRIAL APPLICABILITY OF THE INVENTION

The present invention relates generally to extruded foam products, and more particularly, to polymer foams that have an enlarged average cell size and possess no ozone depleting potential and a low global warming potential. A method of forming such polymer foams is also provided.

BACKGROUND OF THE INVENTION

Foamed resinous structures are useful in a wide variety of applications such as thermal insulation, in cushions, as packaging, and as adsorbents. Extruded foams are generally made by melting a polymer together with any desired additives to create a polymer melt. A blowing agent is mixed with the polymer melt at an appropriate temperature and pressure to produce a foamable gel mixture. The foamable gel mixture is then cooled and extruded into a zone of reduced pressure, which results in a foaming of the gel and the formation of the desired extruded foam product.

Traditional blowing agents used for extruded foam products include chlorofluorocarbons (CFCs) and hydrochlorofluorocarbons (HCFCs). One of the advantages of both CFC and HCFC blowing agents is their high solubility in a polymer melt during the manufacturing process. Higher blowing agent solubility promotes a reduction in viscosity when the blowing agent is mixed with the polymer melt. In turn, lower viscosity leads to lower energy requirements for mixing. On the other hand, a major disadvantage to these traditional blowing agents is that an increasing number of governments worldwide have mandated the elimination of CFC and HCFC blowing agents due to growing environmental concerns. CFCs, and many other halocarbons, have come to be recognized as serious global environmental threats due to their ability to cause stratospheric ozone depletion and global warming. The ozone depletion and global warming impact of chemicals such as CFCs and HCFCs are measured by the ozone depletion potential (ODP) and global warming potential (GWP) respectively.

In view of the mandatory phase out of blowing agents with a high ODP and a high GWP, there has been a movement to replace the conventional blowing agents in favor of more environmentally friendly blowing agents, such as hydrofluorocarbons (HFCs) and $CO_2$ in insulating foam applications. Although HCFCs provide a superior thermal barrier compared to $CO_2$, the chlorine present in the HCFCs still possesses a small ozone depletion potential. Additionally, over time, the chlorofluorocarbon gas phase in the foam is released into the atmosphere, thereby reducing the insulative value of the foam and potentially contributing to the global warming potential. Further, each of these non-conventional blowing agents leads to a different cell size and morphology depending on the particular blowing agent chosen. Unfortunately, the cell sizes of the foam produced by these generally environmentally friendly blowing agents are too small to provide an acceptable insulative value to the foamed product.

Previously, there have been attempts in the art to utilize more environmentally friendly blowing agents or to modify the conventional HCFC blowing agents to reduce the ODP and GWP of the foam produced while maintaining the thermal insulation value of the foam. Some examples of these processes/compounds are described below.

U.S. Pat. No. 5,489,407 to Suh et al. describes a process for making a closed-cell, alkenyl aromatic polymer foam that has an enlarged cell size. The polymer is preferably polystyrene. For environmental reasons, the blowing agent is preferably an inorganic blowing agents such as $CO_2$, nitrogen, argon, water, helium, or air. The composition used to form the foam includes a substantially non-waxy cell size enlarging agent. The cell size enlarging agent has diverse chemical structures, and includes compounds such as polyethylene glycol and polypropylene glycol with a molecular weight of 1200 or more, salts of n-tallow β-amino dipropionate, amine oxides, imidaxoline, fatty acid alkanolamides of $C_{12}$ to $C_{18}$, n-alkyl trimethyl ammonium chloride, ethoxylated linear alcohols, dioctyl ester sodium sulfoccunic acid, polyoxyethylene sorbitan monopalmitate, diglycol laurate, fluoro-chemical surfactants, coco betaine, aqueous emulsions and fluids of silicone compounds (e.g., dimethyl polysiloxane). The composition may optionally contain a nucleating agent (e.g., inorganic substances such as talc, clay, and/or calcium carbonate) to control the size of the foam cells.

U.S. Pat. No. 5,912,279 to Hammel et al. discloses a closed cell foam and a foaming agent that utilizes a hydrogen-containing halo-carbon blowing agent (e.g., HCFC-22) in combination with a hydrogen bond forming blocking agent (e.g., organic ether, ester, or ketone). The presence of the blocking agent reduces the escape of the blowing agent and entry of air into the foam to maintain a low thermal conductivity over a longer period of time. It is asserted that the blocking agent is capable of creating hydrogen bonds with the blowing agent, which dramatically reduces the permeation rate of the halo-carbon blowing agent out of the insulation foam (thereby reducing the global warming potential).

Hammel et al. also disclose a closed cell resinous foam that is formed utilizing an environmentally friendly and low permeable polyfluorocarbon blowing agent. The blowing agent includes more than about 70 weight percent of 1,1,2,2-tetrafluoroethane (HFC-134). The remaining 30 weight percent is formed of blowing agents that are devoid of halogen substituents other than fluorine. The foam body may be formed of any thermoplastic resin (e.g., polystyrene, polyethylene, or polypropylene). The blowing agents typically contain 1 to 2 carbon atoms and are substantially non-flammable, have zero ozone depletion potential, and a low halocarbon global warming potential.

U.S. Pat. No. 6,787,580 to Chonde et al. discloses a multi-modal thermoplastic and thermally insulating polymer foam that has a distribution of large and small cells in a substantial absence of water by using a blowing agent stabilizer. A preferred blowing agent is selected from non-ozone depleting blowing agents such as $CO_2$, hydrocarbons, and hydrofluorocarbons, but not water. The blowing agent stabilizer creates domains of concentrated blowing agent that produce large cells within the foam. Blowing agent molecules that are not associated with the blowing agent stabilizer produce small cells. Suitable blowing agent stabilizers include polyethylene glycol (PEG) and PEG ethers, polyethylene oxide grafted polystyrene/maleic anhydride random copolymers, and ethylene glycol grafted polyurethane random copolymers. The foams may be in the form of planks or sheets, and are particularly useful as thermally insulating articles because they assertedly have high insulating values.

Despite these previous attempts to reduce the ODP and GWP, there remains a need in the art to achieve an extruded polymer foam that has an increased cell size when non-HCFC blowing agents are used, that maintains the positive physical properties of conventional extruded polystyrene foams, and that meets the stringent requirements for a reduction in the global warming potential and ozone depletion potential.

SUMMARY OF THE INVENTION

It is an object of the present invention to provide a composition that is used to form extruded foams having an increased cell size. The composition includes a foamable polymer material, at least one blowing agent, and at least one cell size enlarging agent. The foamable polymer material is preferably an alkenyl aromatic polymer material such as polystyrene. The foamable polymer material may be present in the composition in an amount from about 60% to about 95% by weight. The blowing agent may be present in the composition in an amount from about 2.0% to about 18.0% by weight and include inorganic blowing agents, organic blowing agents, and chemical blowing agents. The blowing agent utilized in the inventive composition is preferably selected such that the composition has a zero ozone depletion and low global warming potential. Examples of such blowing agents include any inorganic blowing agent and/or non-hydrogenated chlorofluorocarbon (non-HCFCs), such as carbon dioxide, argon, water, air, nitrogen, and/or helium. It is to be appreciated that the blowing agent utilized in the inventive formulation does not have a high global warming potential and has a low or zero ozone depleting potential. The cell size enlarging agent may be present in the composition in an amount from about 0.1% to about 10% by weight. Suitable examples of cell size enlarging agents used in the composition include ethylene vinyl acetate (EVA), ethylene methyl acrylate (EMA), polyethylene ethoxylate copolymer, polyethylene glycol (PEG), and combinations thereof. The cell size enlarging agent permits the formation of a foam with large cell sizes that are desirable in order to achieve a high insulation value (R-value) and to optimize the physical properties of the final foamed product. In addition, the cell size enlarging agent provides an increased cell size to the foamed product without detracting from the physical and thermal properties of a conventional foamed product formed without a cell size enlarging agent. Additionally, the inventive composition may contain a nucleating agent in an amount up to about 1.0% by weight and a fire retarding agent in an amount up to about 1.0% by weight. Optional additives such as plasticizing agents, pigments, elastomers, extrusion aids, antioxidants, fillers, infrared attenuating agents, antistatic agents, and/or UV absorbers may be included in amounts necessary to obtain desired characteristics of the foamable gel or resultant extruded foam products.

It is also an object of the present invention to provide a monomodal thermoplastic polymer foam formed from the composition described above. The average cell size of the inventive foam and foamed products produced by the inventive composition is about 50 microns to about 500 microns. The cellular foam produced with the inventive composition is a substantially closed cellular foam with an average density of about 1.0 lbs/ft$^3$ to about 5.0 lbs/ft$^3$. It is desirable that not more than about 5% of the cells are open cells or otherwise "non-closed" cells. The closed cell structure of the foam helps to increase the R-value of a formed, foamed insulation product. Another aspect of the extruded inventive foams is that they possess a high level of dimensional stability. For example, the dimensional stability in any direction may be about 5% or less. The extruded inventive foam can be used to make insulation products such as rigid insulation boards, insulation foam, and packaging products.

It is a further object of the present invention to provide a thermoplastic polymer foam insulative product that is formed of a molded, extruded polymeric foam having the composition described above, namely, a foamable polymer material, at least one blowing agent, and one or more cell size enlarging agents. The average cell size of the insulation product is about 50 microns to about 500 microns. Substantially all of the cells in the extruded insulative product are closed cell. It is desirable that not more than about 5.0% of the cells are open cells or otherwise "non-closed" cells. It is to be appreciated that the closed cell structure of the foam helps to increase the R-value of the formed, foamed insulation product. The R-value per inch of the insulation product may be from about 4.0 to about 8.0. Examples of extruded foam insulative products formed in accordance with the present invention include insulation products such as rigid insulation boards, insulation foam, and packaging products.

Rigid residential insulation boards of the present invention may range from about 0.5 to about 10 inches thick and are typically available in sizes (width×length) of 24"×96"; 48"×96"; 48"×108". The boards are suitable for use in residentials applications including exterior walls, foundation walls, interior basement walls, and under the slab of the basement floor. The foam boards of the present invention may also be used in roof/ceiling applications to add thermal or acoustical control on the underside of a roof deck or at the ceiling line.

Foam boards of the present invention may be used for other applications including concrete decking, steel trusses, masonry cavity walls, steel stud/brick veneer walls, wood stud walls, and in concrete wall forming systems. The dimensions of the boards may be cut to fit the desired application and to meet building code specifications.

It is an advantage of the present invention that the enlarging agent increases the average cell size of the foamed product without detrimentally affecting the physical or thermal properties of the product.

It is another advantage of the present invention that the composition of the present invention has a low global warming potential and little or no ozone depleting potential.

It is yet another advantage of the present invention that the addition of the cell size enlargers requires no modification to existing manufacturing equipment and therefore no increase in manufacturing costs.

It is a further advantage of the present invention that the foams produced by the present composition have no toxicity to living creatures.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
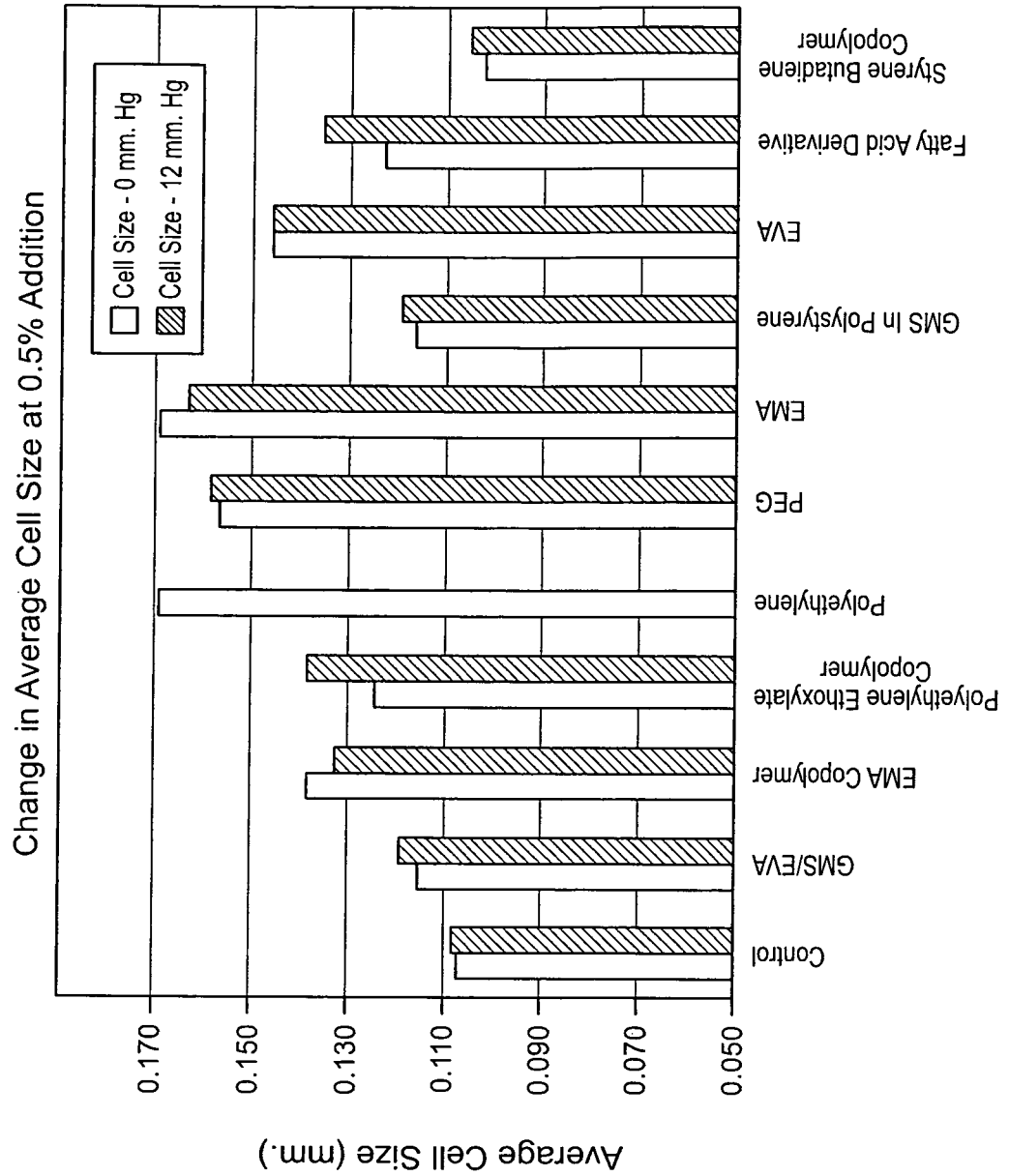
FIG. 1 is a graphical illustration of the change in average cell size for a 0.5% addition of a cell size enlarging agent at both 0 mm Hg and 12 mm Hg.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements. The terms "composition" and "formulation" may be used interchangeably herein. In addition, the terms "increased average cell size" and "enlarged average cell size" may be used interchangeably herein. Further, the terms "composition" and "inventive composition" may be used interchangeably herein.

The present invention relates to polymer extruded or expanded foams that contain a cell size enlarging agent that increases the average cell size of the foamed product. The foams may be formed into an insulation product such as building insulation or underground insulation (e.g., highway, airport runway, railway, and underground utility insulation). The cell size enlarging agent increases the average cell size of the foamed product without detrimentally affecting the physical or thermal properties of the product formed. The composition used to form the expanded foams having an increased cell size includes a foamable polymer material, at least one blowing agent, and one or more cell size enlarging agents. The inventive composition is capable of forming a closed-cell foam material with an increased or enlarged average cell size compared to foams with no cell enlargers.

The foamable polymer material is the backbone of the formulation and provides strength, flexibility, toughness, and durability to the final product. The foamable polymer material is not particularly limited, and generally, any polymer capable of being foamed may be used as the foamable polymer in the resin mixture. The foamable polymer material may be thermoplastic or thermoset. The particular polymer material may be selected to provide sufficient mechanical strength and/or the process utilized to form final foamed polymer products. In addition, the foamable polymer material is preferably chemically stable, i.e., generally non-reactive, within the expected temperature range during formation and subsequent use in a polymeric foam. Non-limiting examples of suitable foamable polymer materials include alkenyl aromatic polymers, polyvinyl chloride (PVC), chlorinated polyvinyl chloride (CPVC), polyethylene, polypropylene, polycarbonates, polyisocyanurates, polyetherimides, polyamides, polyesters, polycarbonates, polymethylmethacrylate, polyurethanes, phenolics, polyolefins, styreneacrylonitrile, acrylonitrile butadiene styrene, acrylic/styrene/acrylonitrile block terpolymer (ASA), polysulfone, polyurethane, polyphenylenesulfide, acetal resins, polyamides, polyaramides, polyimides, polyacrylic acid esters, copolymers of ethylene and propylene, copolymers of styrene and butadiene, copolymers of vinylacetate and ethylene, rubber modified polymers, thermoplastic polymer blends, and combinations thereof.

Preferably, the foamable polymer material is an alkenyl aromatic polymer material. Suitable alkenyl aromatic polymer materials include alkenyl aromatic homopolymers and copolymers of alkenyl aromatic compounds and copolymerizable ethylenically unsaturated comonomers. In addition, the alkenyl aromatic polymer material may include minor proportions of non-alkenyl aromatic polymers. The alkenyl aromatic polymer material may be formed of one or more alkenyl aromatic homopolymers, one or more alkenyl aromatic copolymers, a blend of one or more of each of alkenyl aromatic homopolymers and copolymers, or blends thereof with a non-alkenyl aromatic polymer. Notwithstanding the components of the composition, the alkenyl aromatic polymer material may include greater than about 50 and preferably greater than about 70 weight percent alkenyl aromatic monomeric units. In a preferred embodiment of the invention, the alkenyl aromatic polymer material is formed entirely of alkenyl aromatic monomeric units.

Examples of alkenyl aromatic polymers include, but are not limited to, those alkenyl aromatic polymers derived from alkenyl aromatic compounds such as styrene, α-methylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_2$ to $C_6$ alkyl acids and esters, ionomeric derivatives, and $C_2$ to $C_6$ dienes may be copolymerized with alkenyl aromatic compounds. Non-limiting examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. The foamed products may be formed substantially of (e.g., greater than 95 percent), and most preferably, formed entirely of polystyrene. The foamable polymer material may be present in the composition in an amount from about 60% to about 95% by weight, preferably in an amount from about 80% to about 90% by weight, and more preferably in an amount of about 85% to about 90% by weight. As used herein, the term "% by weight" is meant to indicate a percentage based on 100% total weight of the composition.

The properties of the extruded foam or foam product may be modified by the selection of the molecular weight of the polymer. For example, the preparation of lower density extruded foam products is facilitated by using lower molecular weight polymers. On the other hand, the preparation of higher density extruded foam products is facilitated by the use of higher molecular weight or higher viscosity resins.

The composition also includes at least one blowing agent. Blowing agents useful in the practice of this invention include inorganic blowing agents, organic blowing agents, and chemical blowing agents. Any suitable blowing agent may be used in the practice on this invention. However, due to increased environmental concern over global warming and ozone depletion, it is desirable to utilize inorganic blowing agents. Examples of halo-carbon free inorganic blowing agents (e.g., environmentally friendly, non-ozone depleting blowing agents) include carbon dioxide, argon, water, air, nitrogen, and helium.

Organic blowing agents suitable for use in the present invention include, but are not limited to, $C_1$ to $C_9$ aliphatic hydrocarbons (e.g., methane, ethane, propane, n-butane, isobutane, n-pentane, isopentane, and neopentane), $C_1$ to $C_3$ aliphatic alcohols (e.g., methanol, ethanol, n-propanol, and isopropanol), and fully and partially halogenated aliphatic hydrocarbons having 1 to 4 carbon atoms (e.g., fluorocarbons, chlorocarbons, and chlorofluorocarbons). Examples of suitable fluorocarbons for use in the invention include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, and perfluorocyclobutane. Partially halogenated chlorocarbons and chlorofluorocarbons for use in this invention may include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123), and 1-chloro-1,2,2,2-tetrafluoroethane (HCFC-124). Examples of fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Suitable chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, and N,N'-dimethyl-N,N'-dinitrosoterephthalamide, and trihydrazino triazine.

The blowing agent may be present in the composition in an amount from about 2.0% to about 18.0% by weight. Preferably, the blowing agent is present in an amount from about 3.0% to about 10% by weight. The blowing agent utilized in the inventive composition is preferably selected such that the composition has a zero ozone depletion and low global warming potential, such as, for example, any inorganic blowing agent and/or non-hydrogenated chlorofluorocarbons (non-HCFCs).

As discussed above, the composition also contains one or more cell size enlarging agents. Desirably, the cell size enlarging agent dissolves or substantially dissolves in the foamable gel formed by the foamable polymer material and blowing agent discussed in detail below. Suitable examples of cell size enlarging agents for use in the inventive composition include ethylene vinyl acetate (EVA), ethylene methyl acrylate (EMA), polyethylene ethoxylate copolymer, polyethylene glycol (PEG), and combinations thereof. Structurally and chemically, these materials are based on polyethylene with added polarity. Preferably, the cell size enlarging agent is ethylene vinyl acetate and/or ethylene methyl acrylate. In addition, the cell size enlarging agent permits the formation of a foam with large cell sizes that are desirable in order to achieve a high insulation value (R-value) and to optimize the physical properties of the foamed product such as compressive strength and dimensional stability.

The use of ethylene vinyl acetate (EVA) and/or ethylene methyl acrylate (EMA) as a blowing agent in polymer foams is contradictory to the current thought of those ordinarily skilled in the art, and as such, one of skill in the art would not readily choose to utilize either of these ethylene compounds as a cell size enlarging agent. Conventionally, much of the testing with polystyrene resin foams has been conducted with a polyethylene additive. It was determined that these polyethylene additives separated from the polymer resin (e.g., polystyrene) and bloomed to the surface. As a result, those of skill in the art generally went looking for other additives for use in conventional blowing agents used in polystyrene foams. However, it was surprisingly and unexpectedly discovered in the present invention that ethylene vinyl acetate and ethylene methyl acrylate mix well or at least sufficiently well at low concentrations in the foamable polymer material and causes an increase in the cell size of the produced foam. Not wishing to be bound by theory, it is believed that the ester groups present on the EVA and the EMA provide a source of energy, and that it is this source of increased energy that increases the cell size within the foam.

In a similar manner of thinking, polyethylene glycol (PEG) is believed to provide better cell size enlarging properties to the foam and increased interaction with the blowing agent due to its increased energy source (i.e., the hydroxyl end group of the glycol) compared to polyethylene oxide (PEO). The fundamental difference between polyethylene oxide and polyethylene glycol is the terminal hydroxyl group of the glycol in the polyethylene glycol. Again, not wishing to be bound by theory, it is believed that it is this energy difference that allows the polyethylene glycol (PEG) to increase the cell size of the foam.

One advantage of the cell size enlarging agent is that it provides an increased cell size to the foamed product without detracting from the physical and thermal properties of a conventional foamed product formed without a cell size enlarging agent. The cell size enlarging agent also provides a smoother surface and minimal or no surface defects to the extruded, foamed product, especially when compared to conventional foamed products. In addition, the improved smoothness of the surface area of the foamed product permits the inventive foam to be used in a wider variety of applications. The average cell size of the inventive foam and foamed products is about 50 microns to about 500 microns and preferably about 150 microns to about 250 microns. The cell size enlarging agent may be present in the inventive formulation in an amount from about 0.1% to about 10% by weight, and preferably in an amount from about 0.25% to about 2.0% by weight.

Additionally, the inventive composition may optionally contain a nucleating agent. Examples of nucleating agents useful in the invention include calcium silicate, calcium carbonate, calcium stearate, clay, silica, titanium dioxide, barium sulfate, diatomaceous earth, and indigo. Adding a nucleating agent to the inventive composition permits the addition of cheap filler materials into the foamed product. Therefore, it is desirable to add as much nucleating agent as possible to introduce a large amount of fillers into the foamed product. However, nucleating agents tend to decrease the cell size of the cells in the foam, which results in undesirable R-values of the final foamed products. As a result, a nucleating agent is not present in large amounts in the present composition (if it is present at all) and the decrease in cell size caused by the nucleating agent may be offset or regulated by the cell size enlarging agent. It is to be appreciated that the addition of talc as a nucleating agent substantially reduces the cell size, and therefore is not a preferred nucleating agent for the present invention. The nucleating agent may be added to the composition in an amount up to about 1.0% by weight, preferably from about 0.1% to about 0.9% by weight, and more preferably from about 0.2% to about 0.4% by weight.

Further, the inventive composition may contain a fire retarding agent in an amount up to about 1.0% by weight. For example, fire retardant chemicals may be added in the extruded foam manufacturing process to impart fire retardant characteristics to the extruded foam products. Preferably, the fire retarding agent is added to the foamable gel, which is described below with respect to the formation of the inventive foam. Non-limiting examples of suitable fire retardant chemicals for use in the inventive composition include brominated aliphatic compounds such as hexabromocyclododecane and pentabromocyclohexane, brominated phenyl ethers, esters of tetrabromophthalic acid, and combinations thereof.

Optional additives such as infrared attenuating agents, plasticizing agents, pigments, elastomers, extrusion aids, antioxidants, fillers, antistatic agents, and/or UV absorbers may be incorporated into the inventive composition. These optional additives may be included in amounts necessary to obtain desired characteristics of the foamable gel or resultant extruded foam products. Although it is preferred that the additives are added to the polymer mixture, they may be incorporated in the polymer mixture before, during, or after the polymerization process used to make the polymer.

To form an alkenyl aromatic polymer foam having an enlarged cell size according to the principles of the instant invention, the foamable polymer material (e.g., an alkenyl aromatic polymer material) and the cell size enlarging agent may be heated to a temperature at or above the polymer's glass transition temperature or melting point to form a plasticized or a melt polymer material. One or more blowing agents may then be incorporated or mixed into the melt polymer material by any conventional method known to those of skill in the art such as, for example, with an extruder, a mixer, or a blender. As the blowing agent is added to the polymer melt, the blowing agent becomes soluble, i.e. dissolves, in the polymer melt and forms a foamable gel. Additionally, the blowing agent may be mixed with the melt polymer material at an elevated pressure sufficient to prevent substantial expansion of the melt polymer material and to generally disperse the blowing agent homogeneously in the melt polymer material. A nucleating agent may be blended in the polymer melt or dry blended with the polymer material prior to plasticizing or melting the foamable polymer material. In an alternate embodiment where polyethylene ethoxylate copolymer and/or polyethylene glycol (PEG) is utilized in a liquid form, it may be added directly to the extruder.

The foamable gel may then be cooled to a die melt temperature. The die melt temperature is typically cooler than the melt mix temperature to optimize physical characteristics of the foamed product. In addition, it is desirable that the die pressure be sufficient to prevent, or at least minimize, pre-foaming of the foamable gel. Pre-foaming is the undesirable premature foaming of the foamable gel before extrusion of the gel into a region of reduced pressure. Thus, the die pressure varies depending upon the identity and amount of blowing agent present in the foamable gel. The foamable gel may then be extruded through a die having a desired shape to a zone of lower or reduced pressure to form the desired foamed structure or foamed product. The zone of lower pressure is at a pressure lower than that in which the foamable gel is maintained prior to extrusion through the die. The lower pressure may be superatmospheric or subatmospheric (i.e., a vacuum), but is preferably at atmospheric level.

Extruded foams have a cellular structure with cells defined by cell membranes and struts. Struts are formed at the intersection of the cell membranes, with the cell membranes covering interconnecting cellular windows between the struts. In the present invention, the inventive composition preferably produces a substantially closed cellular foam with an average density of about 1.0 lbs/ft$^3$ to about 5.0 lbs/ft$^3$, preferably from about 1.5 lbs/ft$^3$-3.0 lbs/ft$^3$ and a cell size of from about 50 microns to about 500 microns which makes the foam especially useful for thermal insulation. It is to be appreciated that the phrase "substantially closed cell" is meant to indicate that the foam contains all closed cells or nearly all of the cells in the cellular structure are closed. It is desirable that not more than about 5.0% of the cells are open cells or otherwise "non-closed" cells. The closed cell structure helps to increase the R-value of a formed, foamed insulation product. R-value is defined as the thermal resistance to heat flow across a sample material of a unit area and known thickness caused by a temperature difference across it ($m^2$*K/W). The R-value per inch may be about 4.0 to about 8.0. In a most preferred embodiment, the R-value per inch is about 5.0. It is to be appreciated that it is within the purview of the present invention to produce an open cell structure, although such an open cell structure is not a preferred embodiment.

Another aspect of the extruded inventive foams is that they possess a high level of dimensional stability. For example, the change in dimension in any direction is about 5% or less. In addition, the foam formed by the inventive composition is desirably monomodal and the cells have a relatively uniform average cell size. As used herein, the average cell size is an average of the cell sizes as determined in the X, Y and Z directions. In particular, the "X" direction is the direction of extrusion, the "Y" direction is the cross machine direction, and the "Z" direction is the thickness. In the present invention, the highest impact in cell enlargement is in the X and Y directions, which is desirable from an orientation and R-value perspective. The extruded inventive foam can be used to make insulation products such as rigid insulation boards, insulation foam, and packaging products.

There are numerous advantages of utilizing the composition of the present invention to form foam products. For example, the blowing agent utilized in the inventive formulation does not have a high global warming potential and has a low or zero ozone depleting potential. In addition, the cell size enlarging agents may be added to the melt polymer in a conventional fashion. Therefore, there is no need to modify existing equipment or change the manufacturing lines to accommodate the cell size enlarging agent. In addition, the cell size enlarging agent is environmentally friendly and does not create any negative environmental concerns. Further, the cell size enlarging agent increases the average cell size of the foamed product without detrimentally affecting the physical or thermal properties of the product.

Having generally described this invention, a further understanding can be obtained by reference to certain specific examples illustrated below which are provided for purposes of illustration only and are not intended to be all inclusive or limiting unless otherwise specified.

EXAMPLES

Example 1—Effect of Cell Size Enlarging Agent on Average Cell Size

Compositions containing polystyrene, a non-ozone depleting blowing agent, and the cell size enlarging agents depicted in FIG. 1 were formed according to the method described in detail above. In particular, the polystyrene and cell size enlarging agent were heated to a temperature of 250° C. (i.e., above the melt temperature of the polystyrene) to form a melt polymer material. The desired blowing agent was then mixed into the melt polymer to form a foamable gel. The foamable gel was cooled to 110° C.-130° C. The foamable gel was then extruded through a die to a zone of reduced pressure to produce the foam. A similar method was used to form the compositions set forth in FIGS. 5 and 6, but with a 1.0% by weight addition of the cell size enlarging agent.

Figure 2:
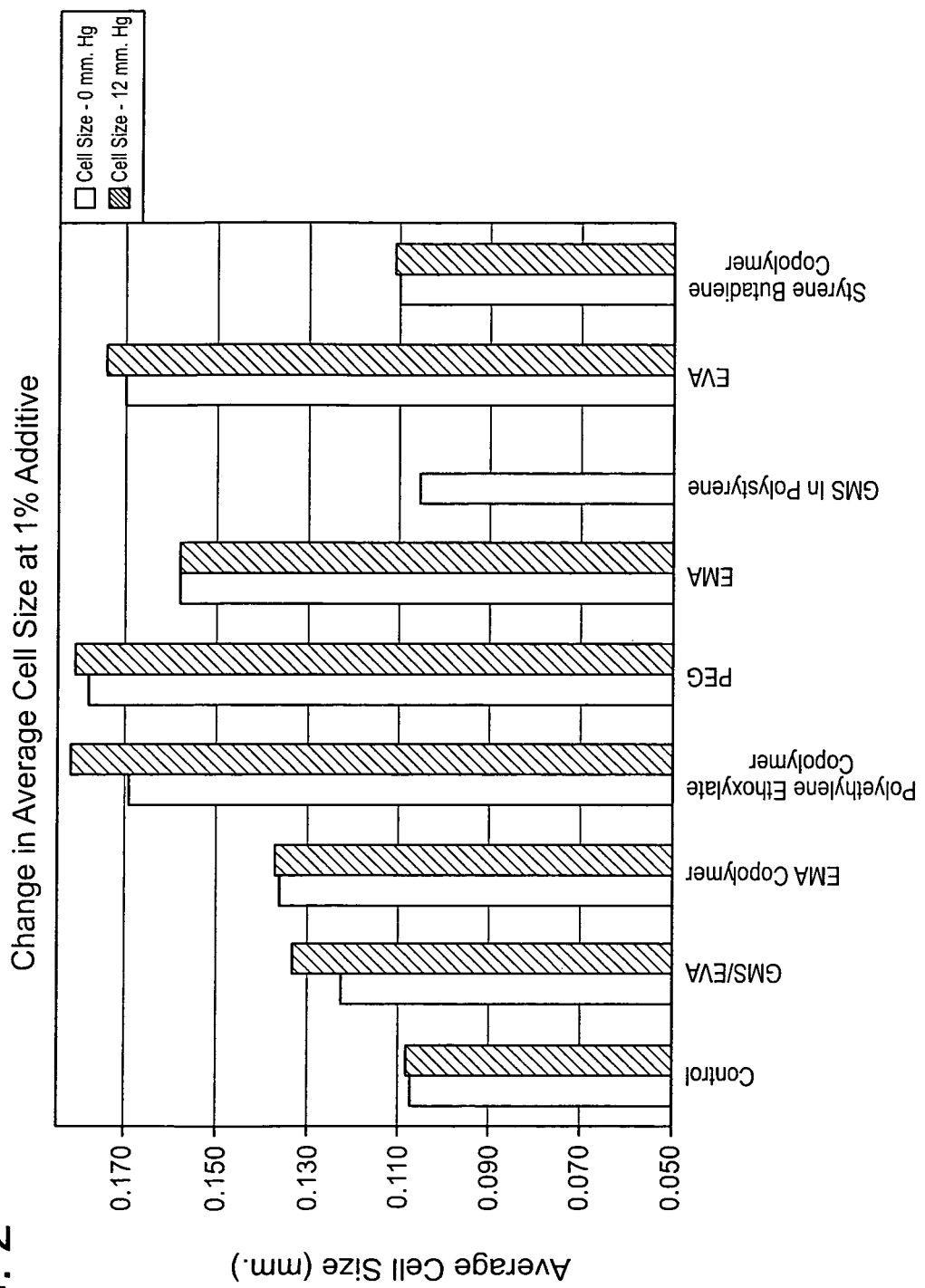
FIG. 2 is a graphical illustration of the change in average cell size for a 1.0% addition of a cell size enlarging agent at both 0 mm Hg and 12 mm Hg.

As shown in FIGS. 1 and 2, polyethylene ethoxylate copolymer, polyethylene glycol (PEG), ethylene vinyl acetate (EVA), and ethylene methyl acrylate (EMA) demonstrated the greatest increase in cell size compared to the control, which contained no cell size enlarging agent. It can be seen in FIG. 2 that the increase in cell size (i.e., the impact of the cell size enlarging agent), is greater at the higher concentration of 1.0% by weight.

Figure 3:
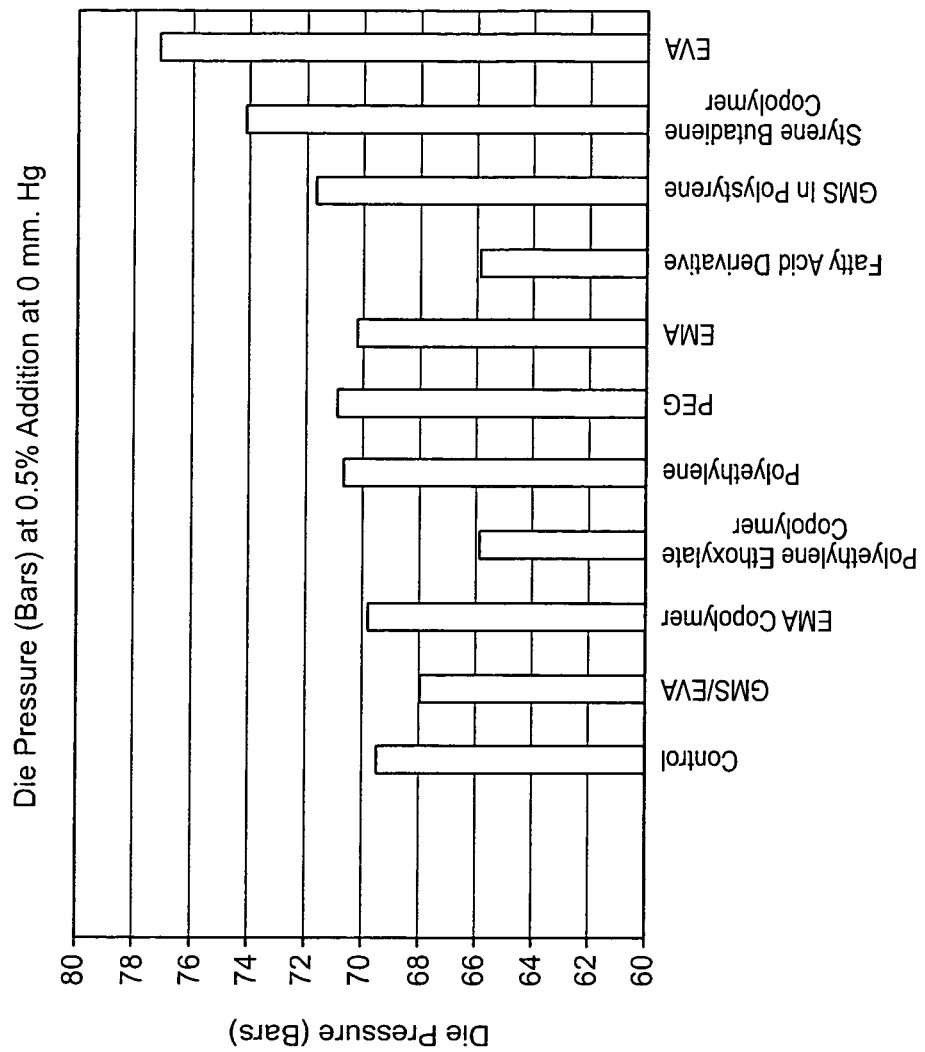
FIG. 3 is a graphical illustration of the die pressure of select compositions from FIG. 1 with a 0.5% addition of a cell size enlarging agent at 0 mm Hg.
Figure 4:
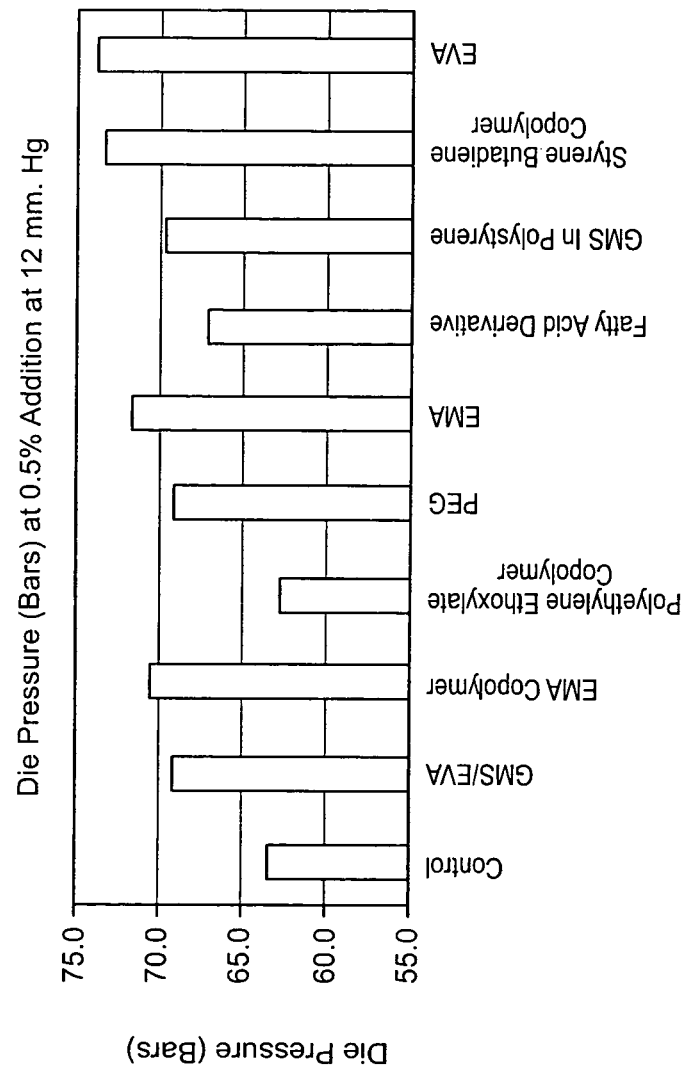
FIG. 4 is a graphical illustration of the die pressure of select compositions from FIG. 1 with a 0.5% addition of a cell size enlarging agent at 12 mm Hg.
Figure 5:
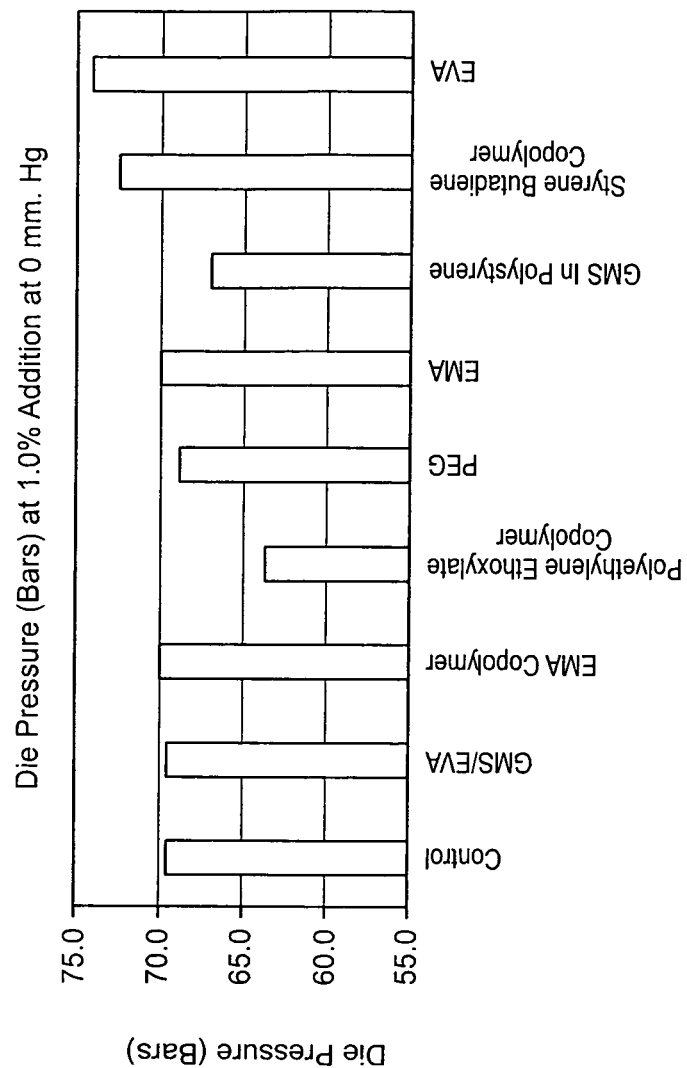
FIG. 5 is a graphical illustration of the die pressure of select compositions from FIG. 1 with a 1.0% addition of a cell size enlarging agent at 0 mm Hg.
Figure 6:
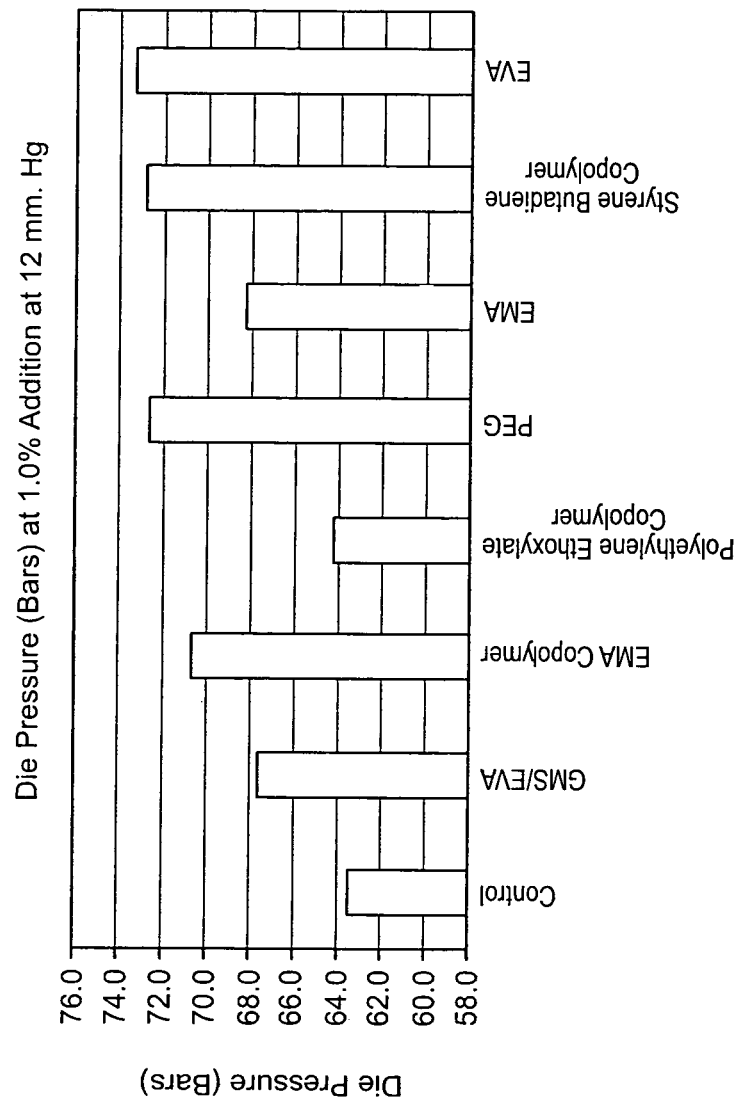
FIG. 6 is a graphical illustration of the die pressure of select compositions from FIG. 1 with a 1.0% addition of a cell size enlarging agent at 12 mm Hg.

FIGS. 3-6 depict the effect on die pressures using various cell size enlarging agents at different pressures and concentrations. As can be seen in FIGS. 3 and 5, the die pressure of the polyethylene ethoxylate copolymer is less than the control (no cell size enlarging agent) at both 0.5% by weight addition at 0 mm Hg and at 1.0% by weight addition at 0 mm Hg. This decrease in pressure, if taken into consideration in isolation and not in conjunction with other factors such as the amount of cell size enlargement caused by the cell size enlarging agent and/or the cost of the cell size enlarging agent, would indicate that polyethylene ethoxylate would be the candidate of choice as a desirable cell size enlarger. However, although it is advantageous to have a low die pressure in the extruder (but not such that it causes a pre-foaming of the foamable gel), from a practical point of view, the specific cell size enlarging agent will not always permit a low die pressure. This fact can be seen, for example, with EVA, which demonstrated an increase in cell size enlargement at both 0.5% by weight and 1.0% by weight addition, but demonstrated an increased die pressure. EMA, as shown in FIG. 1, demonstrated the greatest increase in cell size at 0.5% by weight addition at both 0 and 12 mm Hg. However, it demonstrated an increase in die pressure at 0.5% by weight increase at 0 mm Hg. Thus, FIGS. 3-6 are included to show that multiple factors were taken into consideration in determining the cell size enlarging agent for use in the composition to form a foamed product.

Example 2—Effect of Cell Size Enlarging Agents on Average Cell Size

Figure 7:
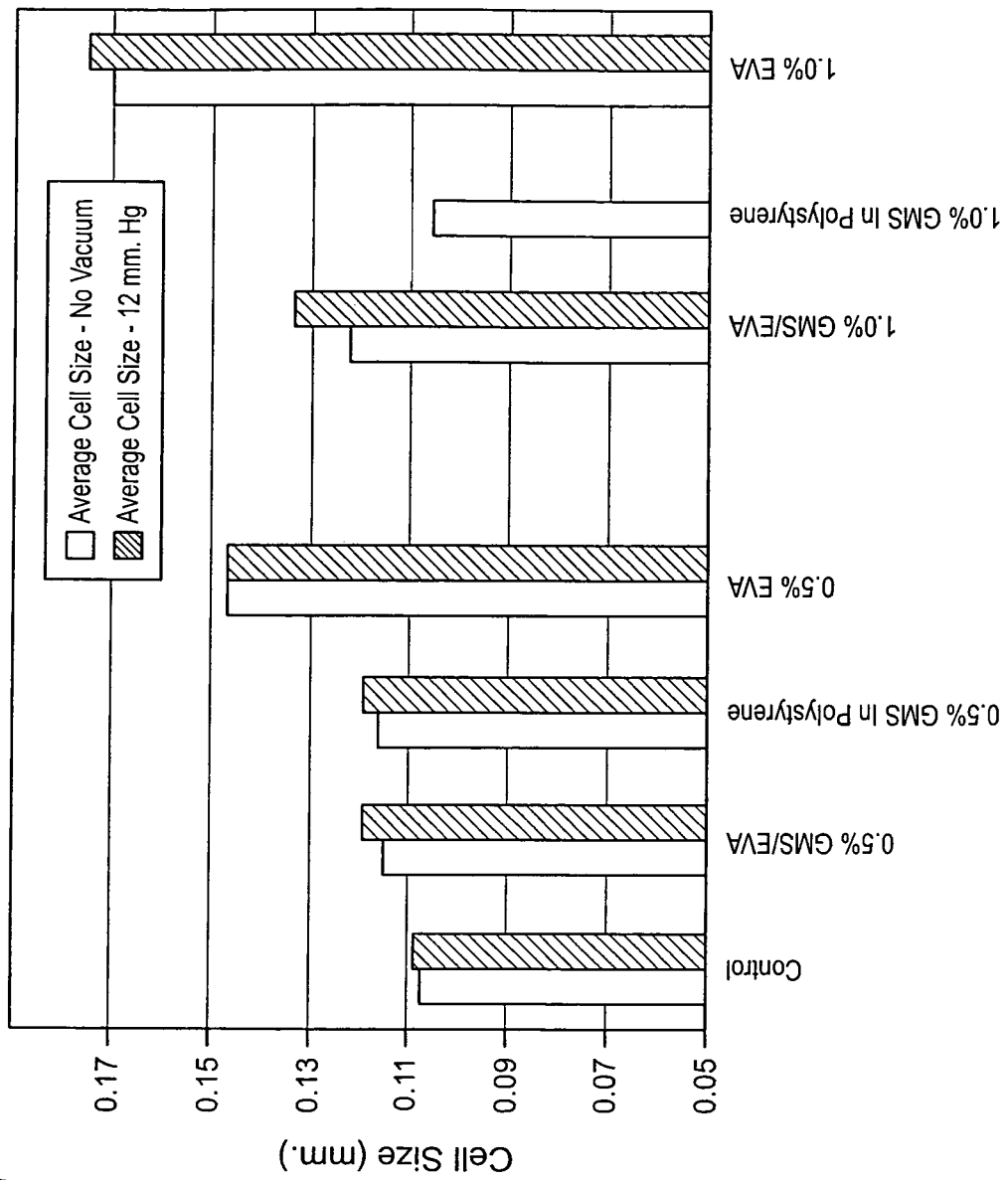
FIG. 7 is a graphical illustration of the average cell size of select compositions with 0.5% and 1.0% addition of a cell size enlarging agent at both 0 mm Hg and 12 mm Hg.

In this Example, a glycerol monostearate/ethylene vinyl acetate mixture (GMS/EVA), a glycerol monostearate and polystyrene mixture, and ethylene vinyl acetate (EVA) were utilized as cell size enlarging agents in a foamable composition according to the present invention. The foamable composition containing the desired cell size enlarging agent were run at two different concentrations, namely, 0.5% and 1.0% by weight cell size enlarging agent. In addition, the foamable compositions were run under two atmospheric conditions, specifically, at no vacuum and at 12 mm Hg. The results of the testing are illustrated in FIG. 7 and in Tables 1-4. As shown in FIG. 7, the results indicated a slight increase in cell size at a 0.5% by weight addition of the glycerol monostearate/ethylene vinyl acetate mixture (GMS/EVA) and a moderate increase in cell size with the glycerol monostearate and polystyrene mixture (e.g., approximately 7-8% increase in cell size). However, the increase in the cell size at 0.5% by weight EVA was substantially larger than the other tested materials at that same concentration.

Of the various cell size enlargers shown in FIG. 7, the increase cell size generally was larger and more prominent with EVA which demonstrated an approximate 36% increase in cell size at 0.5% by weight addition (no vacuum), a 35% increase at 0.5% by weight addition (no vacuum), a 59% increase at 1.0% by weight addition (12 mm Hg), and a 61% increase at 1.0% by weight addition (12 mm Hg). The mixture of GMS and EVA demonstrated a slight increase in cell size at the higher concentration of 1.0% and demonstrated a cell size increase of approximately 14%. There was a no increase in the cell size with the polystyrene/GMS mixture. In fact, there was a decrease in cell size, indicating that the polystyrene/GMS mixture was not an effective cell size enlarger at a higher concentration. Thus, it was concluded from FIG. 7 that of the cell size enlargers tested, the mixture of GMS and EVA was a moderately effective cell size enlarger and EVA was the most effective cell size enlarger.

TABLE 1

| | | | | No Vacuum, 0.5% Addition | | | | | |
|---|---|---|---|---|---|---|---|---|---|
| Additive % Total | X-Cell (mm) | Y-Cell (mm) | Z-Cell (mm) | Average (mm) | Orientation X:Z | X-Cell % Change | Y-Cell % Change | Z-Cell % Change | Ave. % Change |
| None | 0.102 | 0.116 | 0.104 | 0.107 | 0.98:1 | | | | |
| GMS/EVA Mixture | 0.112 | 0.126 | 0.107 | 0.115 | 1.05:1 | 10 | 9 | 3 | 7 |
| GMS Polystyrene Mixture | 0.117 | 0.124 | 0.108 | 0.116 | 1.08:1 | 15 | 7 | 4 | 8 |
| EVA | 0.147 | 0.159 | 0.131 | 0.146 | 1.12:1 | 44 | 37 | 26 | 36 |

TABLE 2

No Vacuum, 1.0% Addition

| Additive % Total | X-Cell (mm) | Y-Cell (mm) | Z-Cell (mm) | Average (mm) | Orientation X:Z | X-Cell % Change | Y-Cell % Change | Z-Cell % Change | Ave. % Change |
|---|---|---|---|---|---|---|---|---|---|
| None | 0.102 | 0.116 | 0.104 | 0.107 | 0.98:1 | | | | |
| GMS/EVA Mixture | 0.118 | 0.132 | 0.117 | 0.122 | 1.01:1 | 16 | 14 | 13 | 14 |
| GMS Polystyrene Mixture | 0.103 | 0.112 | 0.101 | 0.105 | 1.01:1 | 1 | −3 | −3 | −2 |
| EVA | 0.179 | 0.187 | 0.143 | 0.17 | 1.25:1 | 75 | 61 | 38 | 59 |

TABLE 3

2 mm Vacuum, 0.5% Addition

| Additive % Total | X-Cell (mm) | Y-Cell (mm) | Z-Cell (mm) | Average (mm) | Orientation X:Z | X-Cell % Change | Y-Cell % Change | Z-Cell % Change | Ave. % Change |
|---|---|---|---|---|---|---|---|---|---|
| None | 0.104 | 0.11 | 0.11 | 0.108 | 0.95:1 | | | | |
| GMS/EVA Mixture | 0.116 | 0.121 | 0.119 | 0.119 | 0.97:1 | 12 | 10 | 8 | 10 |
| GMS Polystyrene Mixture | 0.118 | 0.122 | 0.117 | 0.119 | 1.01:1 | 13 | 11 | 6 | 10 |
| EVA | 0.149 | 0.149 | 0.141 | 0.146 | 1.06:1 | 43 | 35 | 28 | 35 |

TABLE 4

12 mm Vacuum, 1.0% Addition

| Additive % Total | X-Cell (mm) | Y-Cell (mm) | Z-Cell (mm) | Average (mm) | Orientation X:Z | X-Cell % Change | Y-Cell % Change | Z-Cell % Change | Ave. % Change |
|---|---|---|---|---|---|---|---|---|---|
| None | 0.104 | 0.11 | 0.11 | 0.108 | 0.95:1 | | | | |
| GMS/EVA Mixture | 0.133 | 0.131 | 0.132 | 0.133 | 1.04:1 | 28 | 19 | 20 | 23 |
| EVA | 0.174 | 0.181 | 0.167 | 0.174 | 1.05:1 | 67 | 65 | 52 | 61 |

It can be seen from Tables 1-4 that when the components of the cell size were evaluated in the X, Y, and Z directions, the highest impact from the cell size enlarging agents is on the increase in the X and Y directions. Such an increase in the X and Y directions is desirable from an orientation perspective and thus, an R-value perspective (e.g., decreasing diffusion and increasing cell wall density). It can also be seen from Tables 1-4 that the cell size enlargers impact the cell morphology.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A polymer foam formed from a composition comprising:
   a foamable alkenyl aromatic polymer material;
   from 2% to 18% by weight of a blowing agent comprising carbon dioxide; and
   from 0.1% to 2.0% by weight of at least one cell size enlarging agent comprising ethylene methyl acrylate,
   wherein the composition does not include chlorofluorocarbons (CFCs), HFCs, or non-hydrogenated chlorofluorocarbons (HCFCs), and
   wherein the polymer foam has no more than 5% open cells.

2. The polymer foam of claim 1, wherein the polymer foam has a density from 1.0 lbs/ft$^3$ to 5.0 lbs/ft$^3$.

3. The thermoplastic polymer foam of claim 1, wherein the dimensional stability of the thermoplastic polymer foam in any direction is 5% or less.

4. The polymer foam of claim 1, wherein the at least one cell size enlarging agent provides an increased cell size to a resulting foamed product without detracting from the physical and thermal properties of the foamed product as compared to an equivalent foamed product formed without the at least one cell size enlarging agent.

5. The polymer foam of claim 1, wherein the composition comprises from 0.25% to 0.4% by weight of the at least one cell size enlarging agent.

* * * * *